United States Patent
Hannan et al.

[19]

[11] Patent Number: 6,138,508
[45] Date of Patent: *Oct. 31, 2000

[54] DIGITAL LIQUID LEVEL SENSING APPARATUS

[75] Inventors: Alan R. Hannan; Thomas M. Nickolin, both of Cincinnati, Ohio

[73] Assignee: KDI Precision Products, Inc., Cincinnati, Ohio

[*] Notice: This patent issued on a continued prosecution application filed under 37 CFR 1.53(d), and is subject to the twenty year patent term provisions of 35 U.S.C. 154(a)(2).

This patent is subject to a terminal disclaimer.

[21] Appl. No.: 08/824,046

[22] Filed: Mar. 21, 1997

Related U.S. Application Data

[63] Continuation of application No. 08/328,679, Oct. 25, 1994, abandoned, which is a continuation-in-part of application No. 08/143,834, Oct. 27, 1993, Pat. No. 5,406,843.

[51] Int. Cl.[7] ..................................................... G01F 23/26
[52] U.S. Cl. ......................................... 73/304 C; 324/665
[58] Field of Search ......................... 73/304 C; 364/509; 324/665, 658

[56] References Cited

U.S. PATENT DOCUMENTS

| | | |
|---|---|---|
| 2,519,668 | 8/1950 | Konigsberg . |
| 2,544,012 | 3/1951 | Edelman . |
| 2,621,517 | 12/1952 | Sontheimer . |
| 2,638,000 | 5/1953 | Sontheimer . |
| 2,648,058 | 8/1953 | Breedlove . |
| 2,651,940 | 9/1953 | Kline . |
| 2,751,531 | 6/1956 | Barrett . |
| 2,866,337 | 12/1958 | Minneman et al. . |
| 2,868,015 | 1/1959 | Haropulos . |
| 3,343,415 | 9/1967 | Johnston . |
| 3,391,547 | 7/1968 | Kingston . |
| 3,534,606 | 10/1970 | Stamler et al. . |
| 3,552,209 | 1/1971 | Johnston . |
| 3,620,080 | 11/1971 | Ryder . |

(List continued on next page.)

FOREIGN PATENT DOCUMENTS

| | | | |
|---|---|---|---|
| 0103321 | 3/1984 | European Pat. Off. | ............. 73/304 C |
| 000538182 | 4/1993 | European Pat. Off. | ............. 73/304 C |
| 2662249 | 11/1991 | France . | |
| 58-123431 | 7/1983 | Japan . | |
| 748138 | 7/1980 | Russian Federation . | |
| 2066961A | 7/1981 | United Kingdom . | |
| 2074325 | 10/1981 | United Kingdom | ................. 73/304 C |

*Primary Examiner*—Andrew H. Hirshfeld
*Attorney, Agent, or Firm*—Harness, Dickey & Pierce, PLC

[57] ABSTRACT

A digital liquid level sensing apparatus for detecting variations in the dielectric of a substance being sensed. The apparatus includes a capacitive element array including a plurality of individual (i.e., segmented) input plates positioned along an axis of measurement of a fluid to be detected. The array also includes a common output plate having a length sufficient to span the entire accumulated length of the input plates. A controller sequentially applies DC excitation pulses to the input plates which cause a series of output currents to be coupled onto the output plate. The output currents are input to a current-to-voltage amplifier which generates a series of corresponding analog output voltages. The analog output voltages are then input to a peak voltage detector circuit to generate a series of peak voltage signals representative of the magnitudes of the analog output voltages. The controller converts each of the peak voltage signals into a corresponding digital value and stores each of the digital values in an on-board memory. The controller then sequentially compares each of the values against at least one predetermined reference value indicative of an output produced by an input plate disposed in air until a predetermined difference is detected between the reference value and any one of the stored digital values. This indicates a predetermined difference in the dielectric, thus indicating that a corresponding input plate is at least partially submerged in fluid.

14 Claims, 5 Drawing Sheets

U.S. PATENT DOCUMENTS

| | | |
|---|---|---|
| 3,935,739 | 2/1976 | Ells . |
| 4,086,528 | 4/1978 | Walton . |
| 4,099,167 | 7/1978 | Pomerantz et al. .................. 73/304 C |
| 4,173,893 | 11/1979 | Hedrick . |
| 4,235,106 | 11/1980 | Maltby et al. . |
| 4,258,422 | 3/1981 | Dougherty et al. . |
| 4,266,144 | 5/1981 | Bristol . |
| 4,350,039 | 9/1982 | van Dyke et al. . |
| 4,417,473 | 11/1983 | Tward et al. . |
| 4,470,008 | 9/1984 | Kato . |
| 4,499,766 | 2/1985 | Fathauer et al. . |
| 4,545,020 | 10/1985 | Branfield . |
| 4,553,434 | 11/1985 | Spaargaren . |
| 4,589,077 | 5/1986 | Pope . |
| 4,611,489 | 9/1986 | Spaargaren et al. .................. 73/304 C |
| 4,676,101 | 6/1987 | Baughman . |
| 4,780,705 | 10/1988 | Beane . |
| 4,841,227 | 6/1989 | Maier . |
| 4,864,857 | 9/1989 | Koon .................. 73/304 C |
| 5,103,368 | 4/1992 | Hart .................. 73/304 C |
| 5,138,880 | 8/1992 | Lee et al. . |
| 5,142,909 | 9/1992 | Baughman . |
| 5,406,843 | 4/1995 | Hannan et al. .................. 73/304 C |
| 5,423,214 | 6/1995 | Lee .................. 73/304 C |
| 5,613,399 | 3/1997 | Hannan et al. .................. 73/304 C |

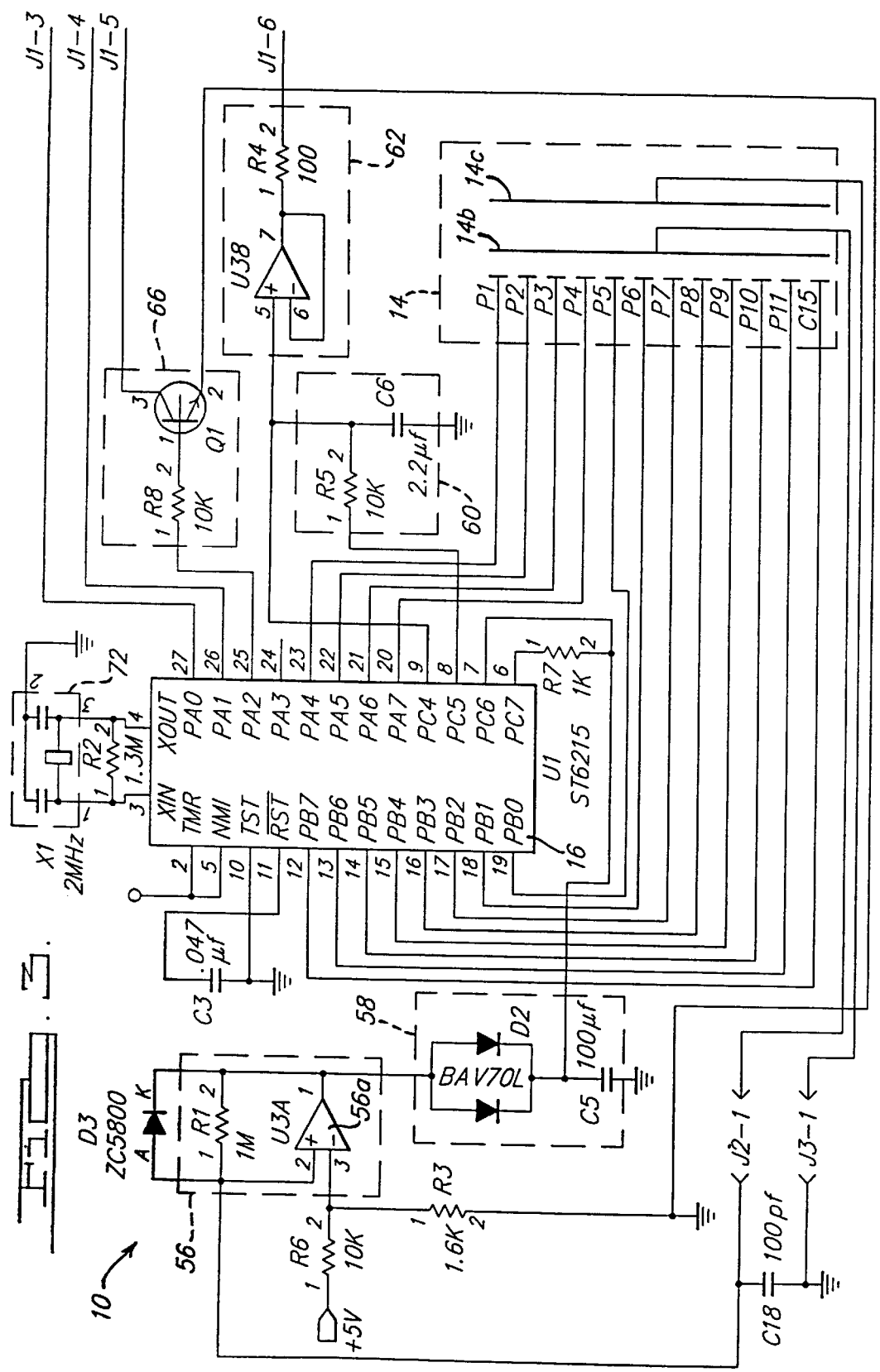

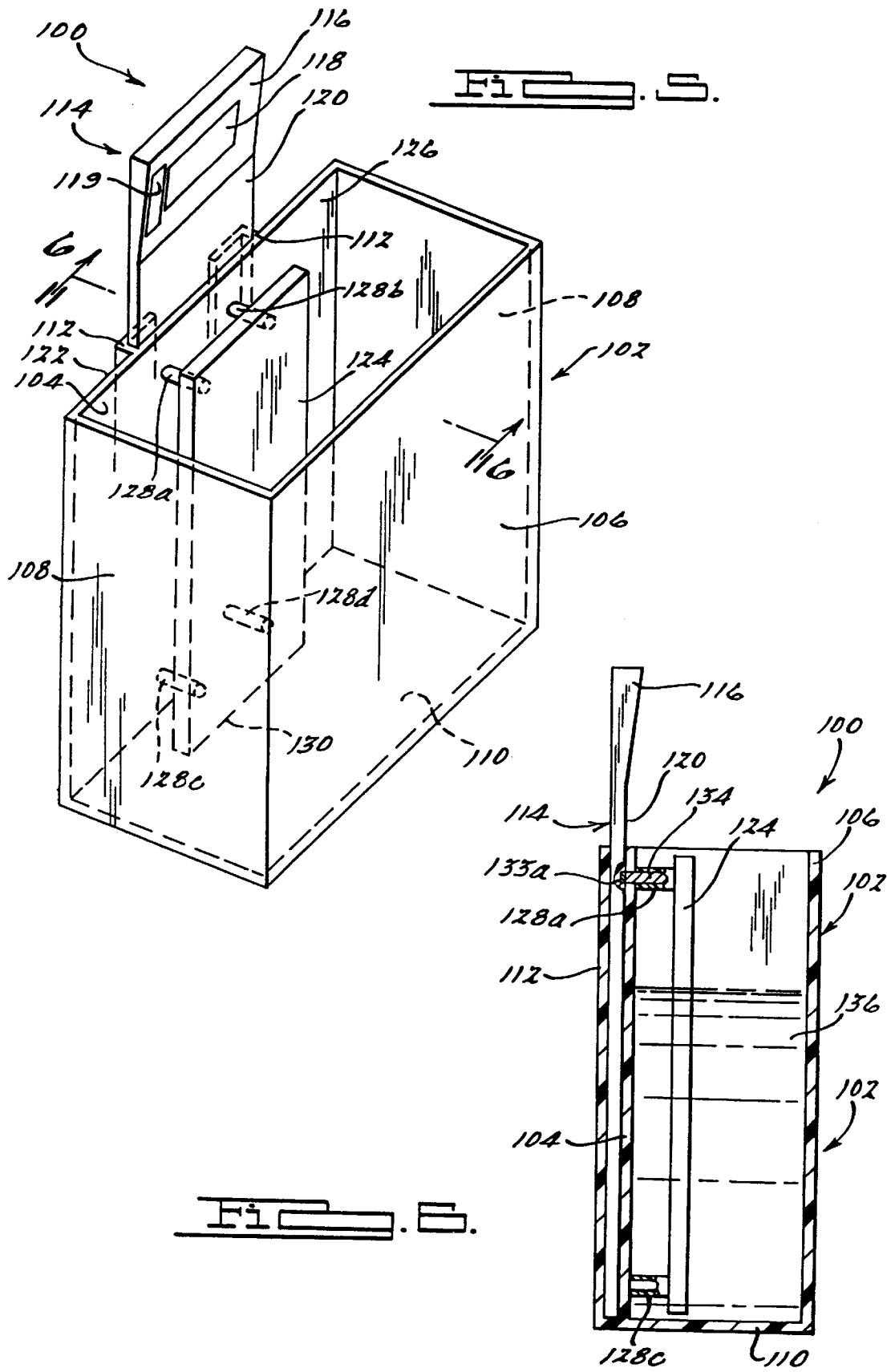

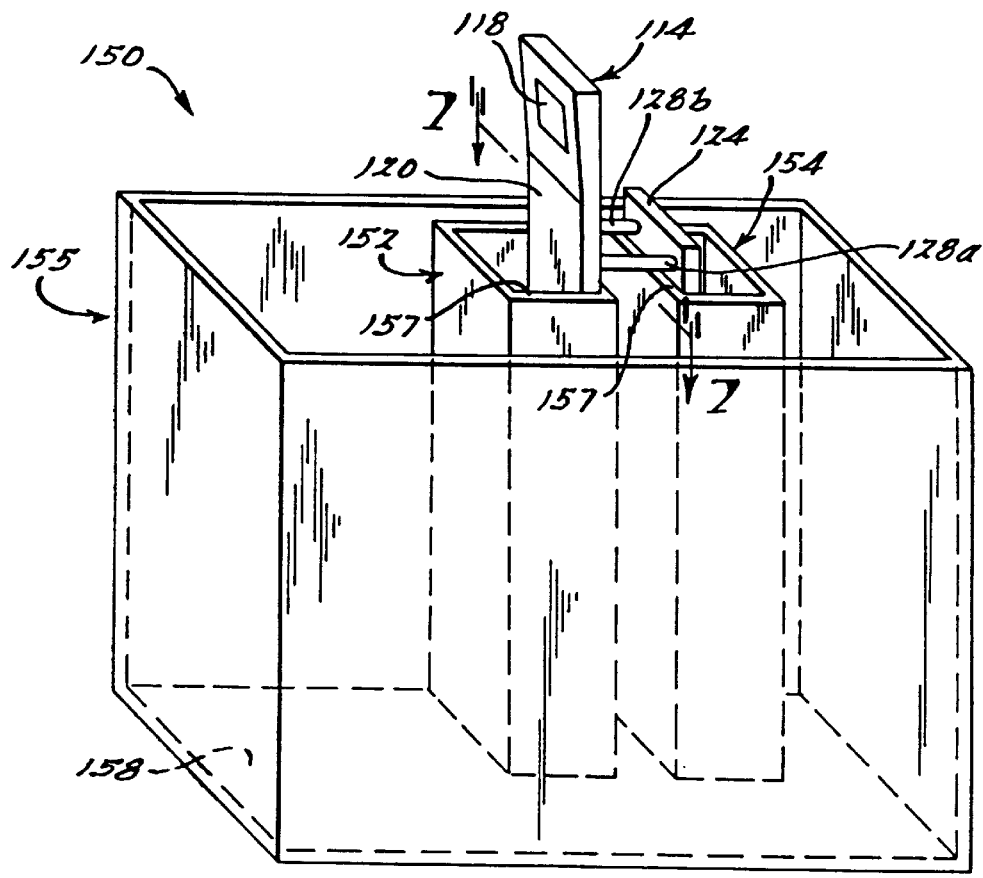
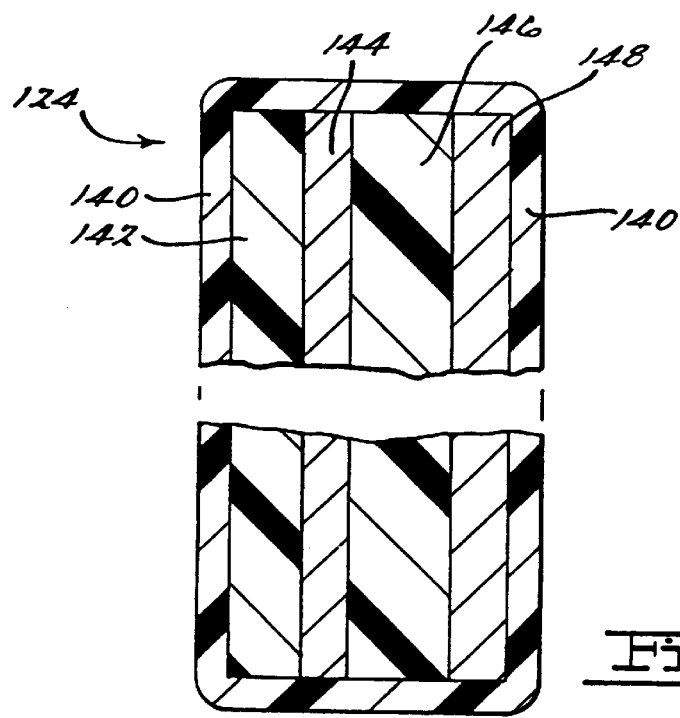

DIGITAL LIQUID LEVEL SENSING APPARATUS

CROSS REFERENCE TO RELATED APPLICATIONS

This application is a continuation of U.S. application Ser. No. 08/328,679 filed Oct. 25, 1994, now abandoned, which is a continuation-in-part of U.S. application Ser. No. 08/143,834 filed Oct. 27, 1993, now U.S. Pat. No. 5,406,843.

BACKGROUND OF THE INVENTION

1. Technical Field

This invention relates to liquid level sensors, and more particularly to a digital liquid level sensing apparatus incorporating a dielectric constant differentiator for detecting variations in the dielectric of segmented portions of a capacitive probe.

2. Discussion

Liquid level sensors are used in a variety of applications to sense fluid levels in reservoirs where it is important or desirable to periodically or continuously monitor the level of the fluid within a reservoir. One form of liquid level sensor employs a capacitive probe having a pair of continuous, elongated elements (i.e., plates) positioned on a substrate of the probe. This form of sensing system makes use of the difference in the dielectric of air from various liquids. In such systems, some means is provided for generating a signal which is applied to one plate of the probe. The overall capacitance of the capacitor formed by the two plates, and thus the magnitude of the signal coupled onto the other one of the plates on the probe, will change as the percentage of the probe submerged in a fluid, and thus the two plates thereof, changes. Thus, the magnitude of the signal coupled onto the output plate of the probe can provide a relative indication of the area of the probe which is submerged in fluid and/or exposed in air.

Many prior developed systems incorporating capacitive probe technology have involved going to great lengths to fully characterize the dielectric constant of the substance whose level is being monitored in an effort to effect an accurate measurement of the level of the substance within a given reservoir. In some instances, such approaches have involved making some form of in-situ measurement of the dielectric constant. Other approaches attempt to avoid the affects of the varying dielectric constant by attempting to remove the variation from the measurement. This is highly desirable because the dielectric constant of a given substance may vary to a significant degree when the substance experiences severe temperature changes or contamination from other substances which enter the reservoir. Thus, the overall accuracy of many such liquid level sensing systems incorporating capacitive probe technology can be greatly adversely affected by changes in the dielectric constant of the substance being measured as the composition of the subject is subjected to various environmental factors (e.g., temperature) and as the composition of the substance varies over a period of time.

One application where liquid level sensors are particularly desirable is with automotive vehicles. Recently there has been increasing interest in monitoring an even greater number of different fluids associated with motor vehicles to ensure that such fluids remain at optimum levels. For example, there has been increasing interest in incorporating sensing apparatus for sensing engine coolant levels, transmission fluid levels and differential case fluid, just to name a few. The use of liquid level sensing apparatus with such fluids, however, presents a number of problems due to the extreme environmental changes which such a sensing apparatus must be able to tolerate, as well as the cost constraints which must be met in order for the apparatus to be economically mass produced without adding significantly to the overall price of the vehicle.

Recently released requirements, typical of the auto industry at large, for a fuel level sensor are listed below to provide an idea of the stringency of present day operational parameters which a fuel level sensor suitable for use in automotive applications must meet:

A. Temperature Range
   (−)40° C. to 150° C.
B. Life
   20 Years
C. Response Time
   Preferably in the area of about or reasonably close to 15 milliseconds
D. Accuracy
   0.5 gallons minimum
   0.1 gallons preferred
E. EMI/RFI
   Must be operational in close proximity to fuel pump
F. Fuel Tolerance
   Sensor must be capable of meeting accuracy requirements for the following fuel types:
   TF1
   TF2
   UNLEADED GASOLINES
   100% INDOLENE HO-III
   PEROXIDE FUEL MIX
   METHANOL FUEL MIX
   CORROSIVE GASOHOL
   Additionally, the sensor must be capable of limited exposure to 2 RVP Fuel as well as not being adversely affected by exposure to legal and commercial fuels in the Asian, Mideast and European markets.
G. Underbody Contaminants
   The sensor must withstand prolonged exposure to the following list of potential underbody contaminants:
   Engine Oil
   Transmission Fluid
   Power Steering Fluid
   Coolant/Antifreeze
   Brake Fluid
   Windshield Wash Fluid
   Transaxle/Differential Lube
   Wheel Bearing Lube
   Water
   A/C Refrigerant
   Snow, Ice
   Acid Rain
   Car Wash Chemicals
   Waxes, Paint Sealants
   Steam Cleaning
   Tire Cleaners
   Engine Cleaning
   Carpet Cleaners
   Soft Drinks, Coffee, Etc.
H. Space/Size Requirements
   The sensor shall be contained preferably reasonably close to the following form factors:
   15×4×175 MM
   15×4×400 MM 10×6×175 MM
10×6×400 MM
I. Electrical Requirements
   Operational Voltage:
      10.5 to 16.5 volts
   Output voltage:
      0 to 4.8 volts linearly related to measured level.
J. Mechanical Requirements
   Sensor must survive a three feet vertical drop and still meet the electrical requirements.

As mentioned above, to be suitable for use in automotive applications any liquid level sensor must meet the above requirements in addition to being capable of manufacture at a relatively low cost. This places an additional constraint on the design of the liquid level sensing system. In summary then the fluid level sensing system must accurately measure a variety of materials (i.e., fluids) in a hostile environment as well as being capable of economical manufacture.

Another industry in which the use of level sensors is very advantageous is the medical industry. In the medical industry, and more particularly in hospitals, nursing homes and other health care facilities, it is desirable to employ liquid level sensing systems for monitoring various fluids. For example, a urometer must gauge the level of urine output of a patient. Other applications might involve the application of fluids to a patient via an intravenous fluid mechanism.

In the urometer application mentioned above, it is highly desirable not to be required to re-use any component of a liquid level sensing system which is physically disposed in the urine. Such would require the apparatus disposed in the urine to be periodically cleaned or handled. Accordingly, it would be highly desirable to provide some form of liquid level sensing system that could be used in applications where it is undesirable to handle portions of the sensor apparatus which have come into contact with various fluids, such as urine, and where a relatively inexpensively constructed portion of the sensing apparatus which is physically in contact with the fluid being measured is disposable with the fluid container. Alternatively, it would be highly desirable if the urometer included a liquid level sensing portion which could be quickly and easily detached from a reservoir portion and adapted to sense the level of urine in the reservoir without any component of the liquid level sensing portion making physical contact with the urine. It would further be desirable if just the reservoir portion could be discarded after use and the liquid level sensing portion re-used with a new reservoir thereafter.

Accordingly, it is a principal object of the present invention to provide a liquid level sensing apparatus incorporating a capacitive probe which senses the level of a liquid within a reservoir within which the capacitive probe is placed and which provides a sufficiently high level of accuracy which is not affected by changes in the dielectric constant of the substance being monitored.

It is another object of the present invention to provide a liquid level sensing apparatus which detects the level of a liquid within a fluid reservoir by detecting significant changes in the capacitance of a capacitive sensing probe having a plurality of segmented capacitors formed longitudinally thereon along an axis of measurement of the probe.

It is still another object of the present invention to provide a liquid level sensing apparatus capable of differentiating the dielectric constant of a substance at a plurality of points along a segmented capacitive probe disposed in the substance to thereby provide the capability of determining not only the point at which the capacitive probe becomes disposed in air, but also changes in the dielectric constant of the substance.

It is yet another object of the present invention to provide a liquid level sensing apparatus which is suitable for use with a urometer to sense urine output.

It is still another object of the present invention to provide a liquid level sensing apparatus which is highly suitable for use in connection with a urometer, and which includes a relatively inexpensively constructed portion thereof which is adapted to be placed into the urine held in a reservoir thereof and thereafter discarded when the urometer is to be used on a new patient. In this manner, the apparatus would not require any cleaning or extended handling by health care personnel such as nurses or doctors. The urometer apparatus would also not require extensive disassembly or maintenance, but rather would be adapted to allow a new sensing element of the level sensing apparatus to be used without the above-mentioned drawbacks.

It is still another object of the present invention to provide a liquid level sensing apparatus which is economical to manufacture and suitable for use in hostile environments such as those encountered in various fluid reservoirs on a motor vehicle, or those present in medical applications such as with urometers, and which meets or exceeds industry operating requirements.

SUMMARY OF THE INVENTION

The above and other objects are provided by a digital liquid level sensing apparatus in accordance with preferred embodiments of the present invention. The apparatus includes a segmented capacitive probe having a plurality of independent input plates positioned longitudinally thereon along an axis of measurement of the probe and a common output plate having a length sufficient to span the total length of the input plates. The input plates are coupled to a plurality of independent outputs of a controller. The controller generates a plurality of sequential output signals to electrically excite each of the input plates one plate at a time. As each input plate is electrically excited it causes an output current to be coupled onto the common output plate. The magnitude of the output current depends on the capacitance, which in turn depends on the dielectric constant of the substance between the excited input plate and the common output plate.

The common output plate is coupled to means for converting the current output to a corresponding voltage. In the preferred embodiments this current converting means is comprised of a current to voltage amplifier. The current to voltage amplifier generates a voltage signal having a magnitude which "tracks" the output current coupled onto the common output plate and generates a series of voltage signals representative of the output currents generated as each input plate is electrically excited by the controller. A peak voltage detector receives each of the voltage signals and generates a peak voltage signal therefrom representative of the peak level of the output current coupled onto the common output plate from each one of the input plates.

Each of the peak voltage signals is applied to an input of the controller which compares the peak voltage signals generated on the common output plate from any given input plate with a predetermined reference value stored in a first memory of the controller. Accordingly, the controller performs a plurality of comparisons, sequentially, of the output signals caused from the excitation of each input plate.

In the preferred embodiments each of the peak voltage output signals are converted into a digital representation by an analog-to-digital (A/D) converter of the controller and stored in a second memory of the controller. In the preferred embodiments the predetermined reference value may be calculated from a reference input plate, such as an input plate which is disposed in air even when the reservoir is full of fluid. Alternatively, this value may be a predetermined value which is stored in a read only memory of the controller, or alternatively in external memory such as an electrically erasable, programmable read only memory along with other historical information relating to each particular input plate. One or more additional reference values relating to completely submerged input plates may also be stored in the above-mentioned memories.

An appropriate program controls the comparisons between the output signals generated at the output plate from each of the input plates such that the output signal corresponding to each one of the input plates is subsequently compared against the reference value. The percentage coverage of any partially submerged plate(s) is also rationalized by the controller from the one or more stored reference values. In this matter the controller can detect even extremely small differences in the output signals resulting from excitation of any particular one of the input plates. Accordingly, even input plates which are only partially submerged in fluid cause an output signal which reflects this condition, and which can be readily detected by the controller. Thus, the fluid-air interface can be readily and accurately determined. Variations in the dielectric of the fluid being sensed further do not adversely affect the detection of the fluid-air interface.

In alternative preferred embodiments the apparatus includes an integrator circuit for receiving an output signal from the controller representative of the total coverage of the capacitive plates of the probe in fluid, and for providing an analog output signal indicative of the overall fluid level within the reservoir. In another alternative preferred embodiment the apparatus includes a bi-directional serial interface for enabling bi-directional communication between the controller and any external serial device. The controller of the apparatus may also optionally include means for generating a low level output signal when the sensed fluid level falls below a predetermined minimum level.

In an alternative preferred embodiment of the present invention, the liquid level sensing apparatus is used in connection with a urometer for measuring urine output. In this embodiment one plate is disposed within the interior of a urine reservoir, while the other plate of the apparatus is disposed closely adjacent the exterior surface of the reservoir. Accordingly, only one plate physically rests within the urine collected in the reservoir. In the above-mentioned urometer application, the capacitive plate disposed within the reservoir is the common output plate of the sensor apparatus. The input plates and processor are disposed on a processor/input plate circuit board assembly which is positioned outside of the reservoir but adjacent the wall of the reservoir so as to be closely adjacent the common output plate. The processor/input plate printed circuit board assembly is removably securable to the exterior of the reservoir of the urometer in a manner which allows it to be quickly coupled to the reservoir and uncoupled therefrom. When coupled to the reservoir, the processor/input plate circuit board is electrically coupled to the common output plate via a plurality of conductors which are formed within mounting portions of the reservoir which allow the common output plate to be mounted to the interior of the reservoir. The mounting portions take the form of standoffs which allow the common output plate to be spaced relatively precisely from the interior of the reservoir wall which separates the common output plate from the processor/input plate circuit board. With this arrangement, once the reservoir needs to be changed, the processor/input plate circuit board is simply uncoupled from the exterior of the reservoir and the entire reservoir and common output plate disposed therein may be discarded. In this manner there is no handling or cleaning required of the common output plate when it is desired to dispose of the urine reservoir.

In another alternative preferred embodiment of the present invention, the liquid level sensing apparatus thereof is adapted to be used in connection with a urometer in a manner which does not require either the processor/input plate assembly or the common output plate to be disposed when the apparatus is to be used to monitor the urine output of a new patient. In this embodiment a reservoir is formed within which two upstanding hollow columns extend upwardly from a bottom surface of the reservoir. In one of the hollow columns is placed a portion of the processor/input plate assembly such that at least a portion of the input plates thereof are disposed below an upper edge of the first hollow column. The common output plate is disposed within the second one of the hollow columns such that at least a portion of it is disposed below an upper edge of the second hollow column. The hollow columns are further spaced apart slightly by a predetermined distance such that urine collected within the reservoir can easily flow between the two columns.

With this described arrangement, when it is desired to dispose of the reservoir, the entire processor/input plate assembly and common output plate are removed together as a single assembly from the two hollow columns and the entire reservoir may be disposed of. Accordingly, there is no need to dispose of one or the other of the capacitive plates of the apparatus when the urometer is to be used with a new patient.

While the preferred embodiments of the present invention are particularly well adapted for use with medical applications and automotive vehicle applications, it will be appreciated that the invention could be used in connection with the sensing of virtually any liquid substance as well as a variety of solid substances such as granular or plate type substances. Applications of the apparatus are further not limited to level sensing but could just as easily include humidity sensing, position indicating systems and dielectric strength testing systems. The preferred embodiments of the apparatus provide a relatively low cost, low power consumption apparatus for effectively differentiating dielectric strengths and for accomplishing accurate liquid level sensing.

While the preferred embodiments of the present invention are particularly well adapted for use with automotive vehicle applications, it will be appreciated that the invention could be used in connection with the sensing of virtually any liquid substance as well as a variety of solid substances such as granular or plate type substances. Applications of the apparatus are further not limited to level sensing but could just as easily include humidity sensing, position indicating systems and dielectric strength testing systems. The preferred embodiments of the apparatus provide a relatively low cost, low power consumption apparatus for effectively differentiating dielectric strengths and for accomplishing accurate liquid level sensing.

In yet another alternative preferred embodiment, the apparatus of the present invention incorporates a temperature probe which senses temperature changes in the fluid in which the capacitive plates of the probe are disposed. Changes in the dielectric constant of the fluid due to temperature changes can thereby be factored into the determination of the percentage of coverage of any particular input plate. This further increases the accuracy of the liquid level determination.

BRIEF DESCRIPTION OF THE DRAWINGS

The various advantages of the present invention will become apparent to one skilled in the art by reading the following specification and subjoined claims and by referencing the following drawings in which:

FIG. 3 is a more detailed electrical schematic diagram of the apparatus of FIG. 1.

FIG. 5 a perspective view of a urometer in accordance with an alternative preferred embodiment of the present invention;

FIG. 6 is a cross-sectional view of the urometer of FIG. 5 taken in accordance with section line 6—6 in FIG. 5;

FIG. 7 is an enlarged, fragmentary, cross-sectional view of the common output plate of the urometer of FIG. 5; and FIG. 8 is a perspective view of a urometer in accordance with an alternative preferred embodiment of the present invention.

DETAILED DESCRIPTION OF THE PREFERRED EMBODIMENTS

Figure 1:
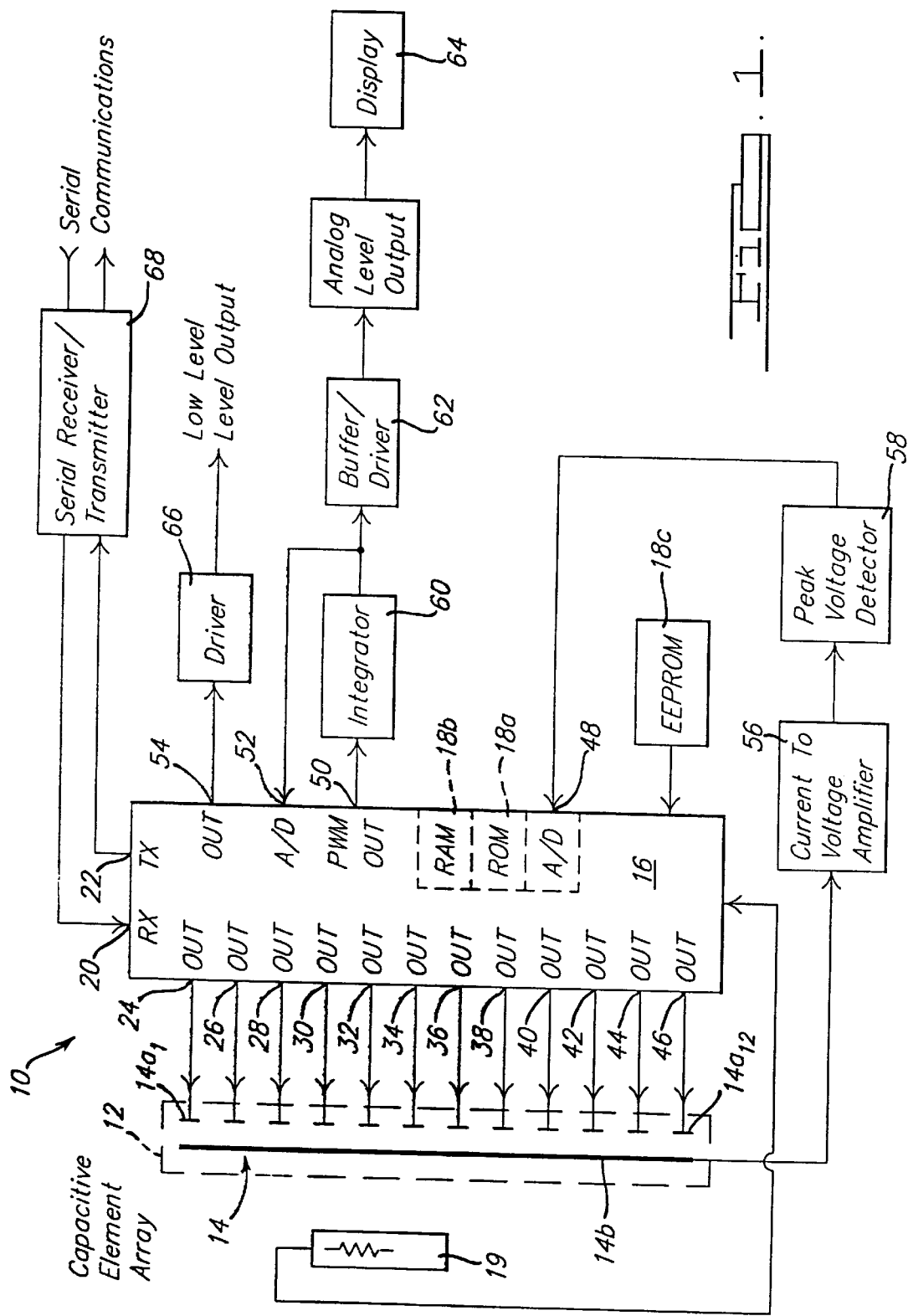
FIG. 1 is a block diagram of a digital liquid level sensing apparatus in accordance with a preferred embodiment of the present invention, and, also showing several optional, yet desirable, circuit components for implementing various optional functions.

Referring to FIG. 1, there is shown a block diagram of a digital liquid level sensing apparatus 10 in accordance with a preferred embodiment of the present invention. The apparatus 10 generally includes a capacitive element array 14 which is disposed on a substrate 12. The array 14 includes a plurality of input plates $14a_1$–$14a_{12}$ and a common output plate 14b. The output plate 14b has a length which is sufficient to span the entire length of the adjacently positioned input plates $14a_1$–$14a_{12}$ and both the common output plate 14b and plurality of input plates $14a_1$–$14a_{12}$ are disposed longitudinally along an axis of measurement of a fluid to be measured within a fluid reservoir.

Each of the input plates $14a_1$–$14a_{12}$ of the capacitive element array 14 are coupled to independent outputs of a controller 16. In the preferred embodiments the controller comprises a microcontroller having a read-only memory (ROM) 18a and a random access memory (RAM) 18b the function of each of which will be described momentarily. It will be appreciated, however, that one or more external memory devices may be used in lieu of the memory devices 18a and 18b if for some reason this is desirable to meet the needs of a particular application. In another preferred embodiment an electrically erasable, programmable, read-only memory (EEPROM) 18c is used for storing reference values for each input plate $14a_1$–$14a_{12}$. In connection with this embodiment an optional temperature sensor 19 may also be incorporated to provide indications of changes in temperature of the fluid in which the array 14 is disposed, which in turn can indicate changes in the dielectric constant of the fluid. By taking into account the changes in the dielectric constant due to temperature, an even more accurate determination can be made as to the percentage coverage of each input plate $14a_1$–$14a_{12}$.

In the preferred embodiments the controller 16 comprises a SGS microcontroller which includes serial communications ports RX 20 and TX 22, and a plurality of output ports 24–46 which are electrically coupled to the input plates $14a_1$–$14a_{12}$. The controller 16 further includes a first analog-to-digital input 48 in communication with an internal analog-to-digital (A/D) converter, a pulse width modulated (PWM) output 50, a second analog-to-digital input 52 and an output port 54.

The common output plate 14b of the capacitive element array 12 is coupled to an input of a current to voltage amplifier 56. The amplifier 56 has its output coupled to an input of a peak voltage detector circuit 58. The output of the peak voltage detector circuit 58 is in turn coupled to the A/D input 48 of the controller 16.

The PWM output 50 of the controller 16 is coupled to an integrator circuit 60. The output of the integrator 60 is in turn coupled to a buffer/driver circuit 62 which generates an analog output level signal to an external analog display device 64. The output of the integrator 60 is shown being coupled back to the A/D input 52 of the controller 16 such that a digital signal can be developed representative of the analog level output signal from the integrator 60. While circuit 60 has been referred to for convenience as an "integrator" circuit, it will be appreciated that this circuit in fact forms a low pass filter with a cut-off frequency far below the repetition rate of the PWM output 50. This causes the circuit to function as an "averaging" circuit with an output voltage equal to the pulse amplitude times the ratio of the pulse width/repetition rate.

The output 54 of the controller 16 is coupled to an optional driver circuit 66 for generating a low fluid level warning output signal. Thus, if the controller 16 determines that the detected fluid level is below a predetermined lower limit, the controller 16 generates a signal on output port 54 which driver circuit 66 uses to generate a warning to an operator of a vehicle or other system with which the apparatus 10 is being used that a particular fluid level is below an acceptable lower limit. While this function of the controller 16 is optional, it is expected at the present time that it will be desirable in many applications, and particularly in those involving automotive vehicles, where it is desirable to provide a warning to an operator of the vehicle immediately if a particular fluid level drops below a predetermined lower limit.

The signal from output port 54 is particularly useful in connection with sensing the level of oil in an oil reservoir of a vehicle. In automotive applications, it is important that the oil level within the oil pan of the vehicle not be allowed to fall below a minimum predetermined level. If such an event occurs, it is very important that the operator of the vehicle be notified immediately by some visual or audible means.

The controller 16 is bi-directionally coupled to a serial receiver/transmitter circuit 68 via the RX and TX outputs 20 and 22, respectively. The serial receiver/transmitter circuit 68 essentially comprises a serial interface circuit which allows the controller 16 to communicate with another external controller, such as an engine control module of an automotive vehicle, to thereby enable a signal representative of the sensed fluid level to be communicated to the external device and other information to be communicated to the controller 16.

Figure 2:
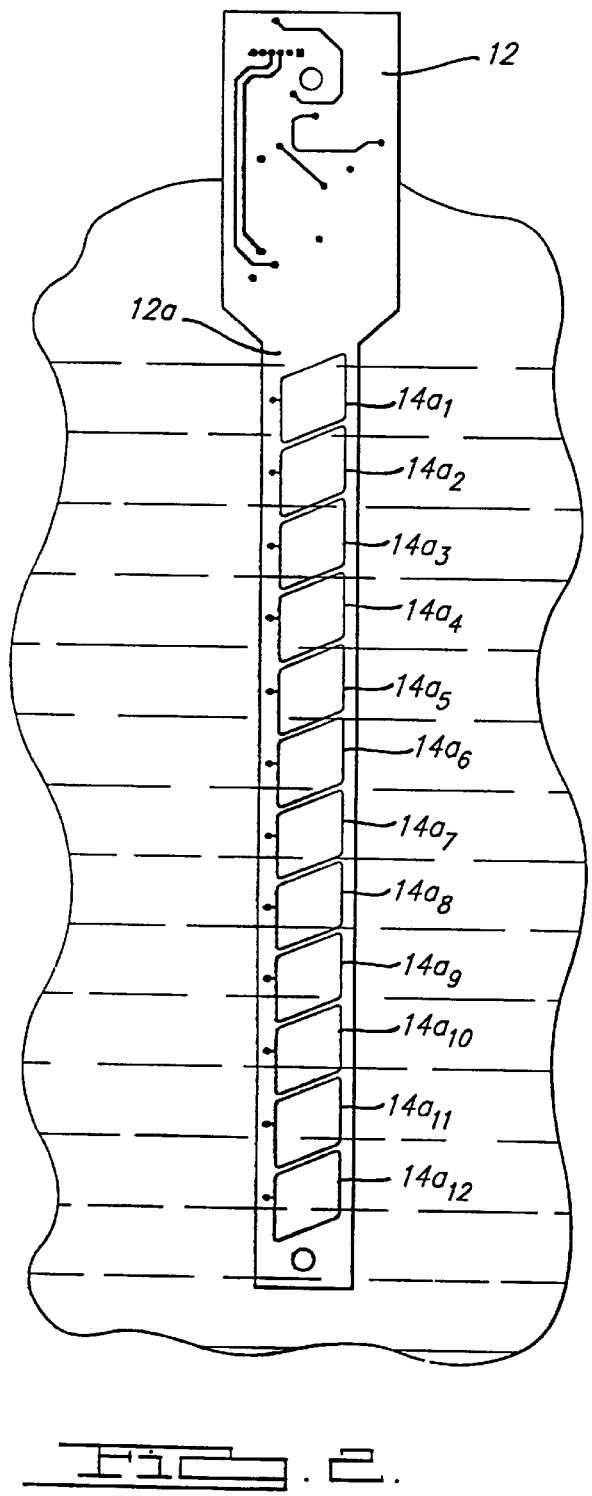
FIG. 2 is an illustration of the capacitive probe showing an exemplary form which the substrate may take and the overlapping of the input plates.

Referring to FIG. 2, the apparatus 10 is disposed on the substrate 12 such that the capacitive element array 14 is disposed on an elongated portion 12a of the substrate 12 within the fluid when positioned in a reservoir. It is anticipated that in most instances all the input plates $14a_1$–$14a_{12}$ will be disposed in fluid when the reservoir is completely full. In the preferred embodiments the input plates $14a_1$–$14a_{12}$ are each formed in the shape of a parallelogram and positioned such that portions of adjacent ones of the plates overlap slightly. This provides plate surfaces along the entire length of the input plates, thus eliminating the "gaps" that would otherwise exist between adjacent input plates $14a_1$–$14a_{12}$.

Referring again to FIG. 1, a description of the operation of the apparatus 10 will now be provided. Initially, the ROM 18a of the controller 16 will include a predetermined "air plate" reference value corresponding to the output current coupled onto the common output plate 14b when any input plate is disposed in air. A predetermined "full plate" reference value will also be stored in the ROM 18a corresponding to an approximate expected output from the output plate 14b produced from exciting an input plate which is completely submerged in fluid.

The controller 16 sequentially applies a very short duration DC voltage pulse to each one of the input plates $14a_1$–$14a_{12}$, one at a time. For example, when the input DC pulse is applied to input plate $14a_2$, an output current is coupled onto the common output plate 14b. The output current will vary in magnitude depending on the capacitance of the capacitor formed between input element $14a_2$ and common output plate 14b. Since the dielectric of air differs significantly from that of liquids, if the input plate $14a_2$ happens to be disposed in air the output current coupled onto the common output plate 14b will be of a receiver plate in the form of a lower magnitude than the current that would be coupled thereon if the input plate $14a_2$ had been submerged in liquid. Thus, the output current coupled onto the common output plate 14b as a result of the input signal applied to each one of the input plates $14a_1$–$14a_{12}$ provides an indication as to whether a particular input plate $14a_1$–$14a_{12}$ is disposed in air, submerged in fluid, or at least partially disposed in fluid.

The controller 16 applies the DC input excitation pulses to the input elements $14a_1$–$14a_{12}$ sequentially such that a series of independent output currents are coupled onto the common output plate 12 and input to the current voltage amplifier 56. In some instances each of the input plates $14a_1$–$14a_{12}$ may not need to be pulsed one at a time. For example, a fast response time algorithm may be used to pulse three of the input plates virtually simultaneously once a partially submerged plate is discovered to thereby allow a plurality of outputs from a corresponding plurality of input plates to be "tracked."

Amplifier 56 generates a series of independent analog voltage signals which each represent the output current coupled onto the output plate 14b by a particular one of the input plates $14a_1$–$14a_{12}$. It is important to note that the common output plate 14b is not allowed to change its voltage potential while input pulses are independently applied to each of the input plates $14a_1$–$14a_{12}$. A changing voltage on the common output plate 14b could potentially cause measurement errors due to current coupling onto other capacitors and other stray parasitic capacitances.

The peak voltage detector circuit 58 generates a series of peak voltage signals which represent the output signals coupled onto the common output 14b as a result of excitation of each one of the input plates $14a_1$–$14a_{12}$. The controller 16 converts these peak voltage signals into a series of corresponding digital values and stores same in the RAM 18b. The controller 16 then, through the control of appropriate software, develops a table of differences from the output currents caused by excitation of all of the input elements $14a_1$–$14a_{12}$. Put differently, a table of digital values is produced corresponding to the outputs generated by exciting the input plates $14a_1$–$14a_{12}$. The controller 16, through its software, then proceeds to compare the differences of the digital output values produced by the input plates $14a_1$–$14a_{12}$ with the previously stored "air plate" and "full plate" reference values. The software program looks for a predetermined, significant difference in the magnitude of the output signal caused by each input plate when compared to the air plate reference value. When the controller detects a predetermined significant difference between a digital value and the air plate reference value, this is an indication that the present digital value corresponds to an output signal generated by a specific, known input plate which is at least partially covered with fluid. As the controller 16 continues to make successive comparisons and determines additional differences between each subsequent digital value and the air plate reference value stored in the ROM 18a, it readily determines which of the input plates are completely disposed in fluid based on the degree of variation of each digital value from the air plate reference value. The percentage of coverage (i.e., submergence) of any particular input plate can then be approximated based on its comparison to the air plate reference value and the full plate reference value. Since the relative position of the apparatus 10 within the reservoir is predetermined, in addition to the shape of the reservoir and the overall volume of the reservoir, detecting the precise point along the axis of measurement at which the liquid-air interface is present allows the overall level of the liquid within the reservoir to be readily extrapolated.

It is anticipated future versions of the apparatus 10 will incorporate software enhancements to compensate for irregular geometries of the containment vessel or reservoir. A look-up table which assigns scaling values to segments according to their position along the array 14 will provide the required correction factors to compensate for odd-shaped reservoirs.

In an alternative preferred form of operation, the predetermined air plate and full plate reference values are used together with real time calculating of "average" air and full plate reference values. In this form of operation the software repeatedly calculates an average air plate value by taking the outputs produced from input plates $14a_1$–$14a_{12}$ which are determined (by comparison with the air plate reference value) to be disposed entirely in air and obtaining an average air plate reference value from these input plates $14a_1$–$14a_{12}$. Similarly, an average full plate reference value is obtained from those input plates $14a_1$–$14a_{12}$ which are determined (initially by comparison to the predetermined air plate or predetermined full-plate reference value) to be completely submerged in fluid. This is done by obtaining the average output produced by the input plates $14a_1$–$14a_{12}$ which are completely submerged in fluid. These average air plate and full plate reference values are then used to rationalize, more accurately, the percentage coverage of any partially submerged input plate $14a_1$–$14a_{12}$. This averaging may be expressed by the following formula:

$$\text{Percentage Coverage} = \frac{V \text{ measured} - V \text{ ref}_{low})}{V \text{ ref}_{high} - V \text{ ref}_{low}}$$

where V measured=measured voltage output value where V ref$_{low}$=reference output voltage for a free input plate; and where V ref$_{high}$=reference output voltage for a fully submerged input plate.

These average reference values are repeatedly calculated, in real time, to take into account small changes in the dielectric constant of the fluid. The percentage coverage value may then be multiplied by a suitable scaling or weighting factor relating to that particular input plate's relative position in the reservoir and/or the volume of fluid in the reservoir.

In yet another preferred form of operation the EEPROM 18c is used to store actual full plate and air plate reference values for each single input plate 14$a_1$–14$a_{12}$. These actual reference values are repeatedly updated during operation such that when a particular input plate 14$a_1$–14$a_{12}$ is determined to be at least partially submerged, its percentage of submergence can be even more accurately determined. If the temperature sensor 19 is used with this embodiment, then the controller 16 can further modify the actual air plate and full plate reference values in accordance with changes in the temperature of the fluid, which temperature changes can affect the dielectric constant of the fluid. To this end a suitable look-up table stored in some memory of the apparatus 10 could be accessed by the controller 16 to obtain appropriate correction factors to be applied based on specific changes in the sensed temperature.

Referring to FIG. 3, a more detailed schematic diagram of the apparatus 10 is shown. In the drawing of FIG. 3 a second capacitive output plate 14c is included on the substrate 14. This output plate 14c is maintained at ground and, in effect, a shield to protect the common output plate 14b from noise currents by shunting any such currents to ground, for systems using a common ground. Preferably, the printed circuit board upon which the apparatus 10 is disposed has an internal ground plane to further eliminate noise transfer.

With further reference to FIG. 3, the current to voltage amplifier 56 comprises an operational amplifier 56a incorporating a feedback resistor R1 coupled to its inverting input to thereby provide a negative feedback loop. Its value is determined based on initial open plate (i.e., an input plate in air) capacitance. Resistors R6 and R3 form a voltage divider for generating a suitable input voltage to the non-inverting input of the operational amplifier 56a. It should be noted that a desirable characteristic of the amplifier 56 is that its output voltage is only affected by input elements which source or sink current from the inverting node (input) of the operational amplifier 56a, which is at virtual ground potential. Since the output plate 14b is tied to this input, many problems otherwise encountered with a common element approach are eliminated. In operation, the adverse loading effects caused by the parasitic capacitance of the un-driven input plates 14$a_1$–14$a_{12}$ is ignored because of this principle.

The peak voltage detector circuit 58 is formed by diode D2 coupled in parallel with capacitor C5. The peak detector 58 functions to capture the peak amplitude of the output pulse generated on the output plate 14b, for each input pulse generated by the controller 16, long enough for the controller 16 to read the signal with its internal A/D converter. Diode D3 prevents gain from positive currents into the amplifier 56 which would try to otherwise make the output of the amplifier 56 go positive. The integrator 60 of FIG. 1 is shown in FIG. 3 as being represented by resistor R5 and capacitor C6. Buffer/driver circuit 62 is represented by operational amplifier U3B and resistor R4. The driver circuit 66 is represented by resistor R6 and NPN transistor Q1. The receive (RX) port 20 and the transmit (TX) port 22 of the controller 16 are shown as ports 27 and 26, respectively, of the controller 16. A ceramic resonator 72 is coupled to the clock inputs of a controller 16 to provide a timing signal of preferably about 2–8 Mhz to the controller 16.

Figure 4:
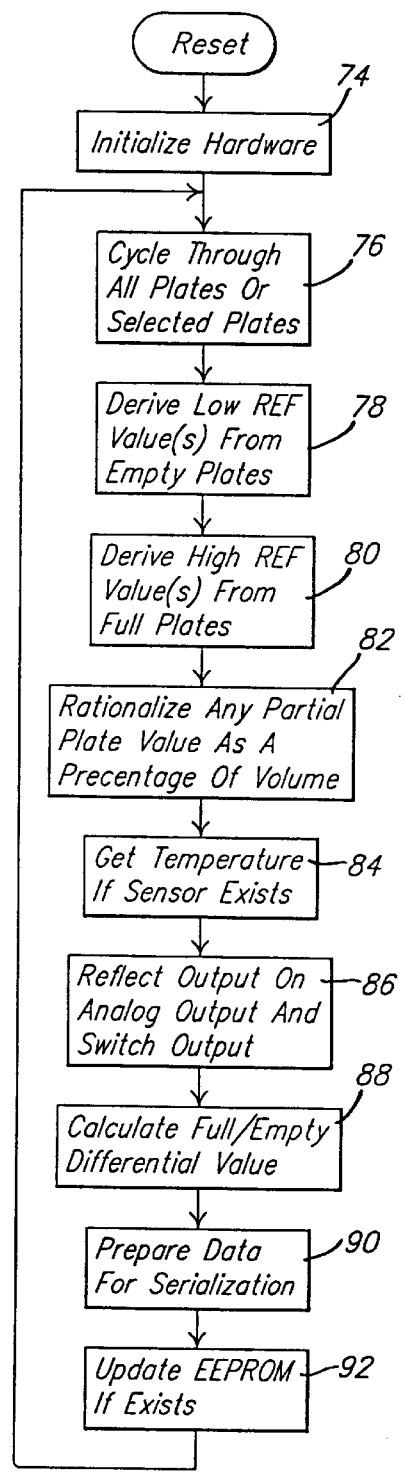
FIG. 4 is flow chart of the series of steps performed by the controller of the apparatus in detecting the presence and absence of fluid along the capacitive probe of the apparatus.

Referring now to FIG. 4, a flowchart is provided which further illustrates the steps of operation of the preferred form of operation of the apparatus 10. At step 74 the controller 16 is initialized. At step 76 the controller cycles through all, or at least a selected sub-plurality, of the input plates 14$a_1$–14$a_{12}$ to obtain a digital output value associated with each input plate 14$a_1$–14$a_{12}$. At step 78 the controller 16 mathematically derives the average air plate (i.e., low plate) reference value from all the input plates which are disposed completely in air. As indicated at step 80, the controller then mathematically derives the average full plate reference value from all the input plates 14$a_1$–14$a_{12}$ which are completely submerged in fluid.

At step 82, the controller determines any input plate 14$a_1$–14$a_{12}$ which is not entirely disposed in air or which is not completely submerged in fluid and further determines the percentage coverage of the input plate (i.e., the percentage of the plate which is submerged in fluid). The controller then reads the temperature sensor 19, if this component is being used, as indicated at step 84 and then prepares to output a signal to at least the PWM controller output 50, as indicated at step 86.

Optionally, the controller 16 may calculate the full/empty differential value between a given input plate's outputs when the input plate is completely submerged in fluid and completely disposed in air, as indicated at step 88. This provides an indication of the dielectric strength of the fluid itself.

Next, the software prepares the data obtained for serial output from port 22, as indicated at step 90. The EEPROM 18c is then updated if this component is being used, as indicated at step 92.

By differentiating the dielectric strength at segmented capacitive input elements, the apparatus 10 of the present invention lends itself well to a variety of applications wherever the dielectric strength of capacitive elements of a probe varies with the level of the substance being detected. Applications of the methodology of the present invention include fluid, gaseous and solid dielectric strength measurements. Specific applications for which the apparatus 10 is particularly well adapted include liquid and solid (granular or plate type substances) level sensing, humidity sensing, and use as a dielectric strength tester and position indicator.

Referring now to FIG. 5, there is shown a urometer 100 in accordance with an alternative preferred embodiment of the present invention. The urometer includes a hollow reservoir 102 adapted to hold urine therein. The reservoir 102 includes an inner side wall 104, an outer side wall 106, a pair of end walls 108 and a bottom wall 110. The walls 104–110 of the urometer 100 are preferably integrally formed to form a single-piece reservoir 102.

With further reference to FIG. 5, the inner side wall 104 further includes a pair of L-shaped shoulder members 112 each integrally formed with the inner wall 104 or secured such as by adhesives or other like means to the inner wall 104. The shoulder portions 112 are adapted to slidably receive a processor/input plate circuit board assembly 114. The assembly 114 includes a processor portion 116, preferably including a display such as a liquid crystal display 118, and an input plate portion 120. The input plate portion 120 is adapted to be held within the shoulder portions 112 abuttingly against an outer surface 122 of the inner side wall 104. The input plate portion 120 includes a plurality of input plates such as input plates $14a_1$–$14a_{12}$ of FIG. 1 and electrically communicates with the processor portion 116. A battery 119 is preferably incorporated into the processor portion so that the urometer is fully portable and not dependent on an AC power source for operation. Alternatively, the processor portion 116 may be adapted for use with an AC power source through the use of suitable rectification circuitry.

With further reference to FIG. 5, the urometer 100 includes a common output plate 124 which is physically mounted to an interior surface 126 of the inner side wall 104 so as to be disposed mostly within the reservoir 102. The common output plate 124 is spaced apart from the interior surface 126 by a plurality of standoffs 128a, 128b, 128c and 128d by a predetermined distance. In the preferred embodiment this distance is preferably between about 0.15"–0.30". The output plate 124 is further positioned within the reservoir 102 such that a lowermost edge portion 130 is disposed relatively closely adjacent an interior surface 132 of the bottom wall 110. Each of the standoffs 128a and 128b further include a conductive element disposed therein which electrically couples the common output plate 124 with the processor portion 116 of the processor/input plate assembly 114.

With reference to FIG. 6, the orientation of the common output plate 124 within the reservoir 102 can be seen together with the construction of the standoff 128a. The standoff 128a generally comprises a tubular plastic member having an electrically conductive element such as a copper wire conductor 134 extending therethrough. The electrically conductive element 134 is in electrical communication with the common output plate 124 and a conductive portion or contact 133a of the processor portion 116 of the processor/input plate assembly 114. It will be appreciated that the electrically conductive element within the standoff 128b makes electrical contact with a corresponding electrical contact (not shown) on the processor portion 116. Accordingly, the capacitive input plates of the input plate assembly 120 operate cooperatively with the common output plate 124 to allow the processor 116 to determine the level of fluid 136 within the reservoir 102 by detecting the liquid/air interface indicated by the changing dielectric constant as the liquid level within the reservoir 102 rises and falls. In this manner, the level of urine within the reservoir 102 can be quickly and reliably monitored via the display 118 of the processor portion 116.

With further reference to FIG. 6, it is a principal advantage of the present invention that the processor/input plate assembly 114 may be slidably removed from the shoulder portions 112 when it is desired to discard the reservoir 102, such as when the urometer 100 is to be used with a new patient after being previously used on a different patient. Since the contact 133a of the assembly 114 makes electrical contact with the electrically conductive element 134 as soon as the assembly 114 is slid into the shoulder portions 112, there is no need for special tools or extensive manual handling of the output plate 124 or extensive disassembly by the user. Thus, the urometer 100 can be quickly used with a new patient by simply sliding the processor/input plate assembly 114 onto a new reservoir 102 having a new output plate 124 disposed therein. Therefore, there is no need to clean any portion of the urometer 100 prior to using the urometer with a new patient.

Referring briefly to FIG. 7, the construction for a preferred embodiment of the output plate 124 is shown. A fluid resistant coating 140 is preferably included about the entire outer surface of the output plate 124. This coating may vary depending upon on the fluids the output plate 124 is anticipated to come in contact with. When the output plate 124 is used as a component of the urometer 100, the coating 140 may comprise a suitable liquid plastic coating. A metallized plate portion 142 is provided which may be formed of unetched copper and which is adjacent on a low dielectric strength material 144. Material 144 may comprise plastic or printed circuit board. A second metallized portion 146 is interposed between the low dielectric strength material 144 and a similar low dielectric strength material 148 such as plastic or a printed circuit board. The second metallized portion 146 may be formed from copper and is tied to ground through the electrically conductive element disposed within the standoff 128b to thus form a "ground plane". Accordingly, a portion of the output plate 124 forms a ground plane while a portion (i.e., portion 142) forms a common capacitive output plate. With regard to the low dielectric strength material 148, it will be appreciated that this material is optional with "non-polar" fluids. When sensing polar fluid, the fluid must be electrically isolated from the sensor or the signal from the input plates on the input plate portion 120 (FIG. 5) of the processor/input plate assembly 114 will be drawn to that source rather than to the output plate 124. Additionally, an electrical barrier must exist over the output plate 124 ground plane. This is achieved by the layer of low dielectric strength material 148 to prevent the signal submitted by the input plates from being drawn to the ground plane formed in part by the second metallized portion 146.

As will also be appreciated by those of ordinary skill in the art, with polar fluids, electrical fields present which have no reference to the sensor formed by the processor/input plate assembly 114 could cause added noise to the signals sensed. This noise will be in the form of primarily 60 Hz (50 Hz when used in European countries) noise. Adding chassis ground to the signal ground of the sensor alleviates this problem. If chassis ground cannot be tied to the processor/input plate assembly 114, appropriate filtering will most likely be required to remove this noise.

Referring now to FIG. 8, a urometer in accordance with an alternative preferred embodiment 150 of the present invention is shown. Components common to the embodiment of FIGS. 5–7 have been indicated with reference numerals corresponding to those used in FIGS. 5–7. The urometer 150 in this embodiment includes two hollow columns 152 and 154 within which the processor/input plate assembly 114 discussed in connection with FIG. 5 is disposed. The difference with the urometer 150 is that the common output plate 124 and the standoffs 128a and 128b are coupled such that the entire assembly 114 may be withdrawn out of the two hollow columns 152 and 154, and the reservoir 155 and columns 152 and 154 disposed of when the urometer 150 is to be used with a new patient. Accordingly, there is no need to dispose of the common output plate 124 or the processor/input plate assembly 114, as neither of these components come into contact with the fluid held within the reservoir 155 due to their being isolated from the fluid by the hollow columns 152 and 154. In this embodiment, the standoffs 128a and 128b are not coupled to any interior wall portion of the reservoir 155, but rather may rest on an upper edge surface 157 of each hollow column 152 and 154, or alternatively the overall length of the output plate 124 and the processor/input plate assembly 114 such that bottom portions thereof rest on bottom inner wall portions of the hollow columns 152 and 154. The hollow columns extend down to a bottom inner surface 158 such that no fluid can enter the columns 152 and 154. The columns 152 and 154 are further spaced apart by a distance preferably within the range of about 0.15"–0.30" such that fluid is able to flow easily therebetween. Thus, the assembly 114 is able to detect the air/fluid interface level by the changing dielectric constant as the fluid within the reservoir rises between the columns 152 and 154.

It will also be appreciated that the embodiments described in connection with FIGS. 5–8 would be suited equally well with little or no modification to a wide variety of other applications involving the monitoring of fluid levels of fluids which are caustic or otherwise undesirable to handle or to have human contact with. The embodiments of FIGS. 5–8 could therefore be used in a wide variety of industrial as well as medical field applications.

It will also be appreciated that the preferred embodiments described herein could be easily modified to provide for various forms of lids (either sealed or not) in addition to pressure relief valves, which could be used in connection with the reservoirs described herein in various applications.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed:

1. Apparatus for determining and monitoring the position of a dielectric material relative to a reference point, comprising:
   a plurality of independent input elements arranged generally parallel to one another and in spaced apart relation to one another;
   a common receiver plate spaced apart but adjacent said input elements for receiving electrical output signals coupled thereonto such that said receiver plate, in cooperation with said input elements, forms a plurality of independent capacitors;
   a controller for applying an electrical signal to each said input element to sequentially electrically excite each of said input elements;
   said controller including:
      an amplifier for generating a voltage signal representative of each said electrical output signal;
      a peak detector for detecting a peak magnitude of each said voltage signal coupled onto said receiver plate as each of said input elements is electrically excited;
      a comparator for comparing said voltage signals against a reference value;
   said controller determining from said voltage signals which ones of said capacitors have experienced a change in capacitance and the relative percentage of coverage of each said capacitor by said dielectric material to make a determination of the position of said dielectric material within a predetermined area.

2. The apparatus of claim 1, wherein said apparatus comprises a urometer.

3. The apparatus of claim 2, wherein said dielectric material is a bodily fluid.

4. A urometer for determining and monitoring the position of a body fluid relative to a reference point comprising:
   a single-piece hollow reservoir adapted to hold said body fluids therein; said reservoir including:
      an inner side wall;
      an outer side wall;
      a pair of end walls;
      a bottom wall;
   said inner side wall including a pair of retaining shoulder members;
   said retaining shoulder members projecting from said inner side wall;
   a plurality of independent input elements arranged generally parallel to one another and in spaced apart relation to one another;
   said independent input elements being disposed on a processor/input plate circuit board assembly comprising a processor portion;
   said retaining shoulder members being adapted to slidably receive said processor/input plate circuit board assembly;
   said retaining shoulder members adapted to hold said processor input plate assembly adjacent to an outer surface of the inner side wall;
   a common receiver plate mounted at least partially within said reservoir adjacent an interior surface of said inner side wall;
   said common receiver plate spaced apart from said inner side wall but adjacent said input
   elements for receiving electrical output signals coupled thereonto such that said receiver plate in cooperation with said input elements, forms a plurality of independent capacitors;
   a controller for applying an electrical signal to each said input element to sequentially electrically excite each of said input elements;
   said controller including:
      an amplifier for generating a voltage signal representative of each said electrical output signal;
      a peak detector for detecting a peak magnitude of each said voltage signal coupled onto said receiver plate as each of said input elements is electrically excited;
      a comparator for comparing said voltage signals against a reference value;
   said controller determining from said voltage signals which ones of said capacitors have experienced a change in capacitance and the relative percentage of coverage of each said capacitor by said body fluid to make a determination of the position of said body fluid within a predetermined area.

5. The urometer of claim 4, wherein said common receiver plate is spaced apart from said interior surface by a plurality of standoffs.

6. The urometer of claim 5, wherein said standoffs space apart the common receiver plate from the interior surface by a distance between about 0.15 inch–0.30 inch.

7. The urometer of claim 5, wherein said standoffs further include a conductive element disposed therein which electrically couples the common receiver plate with the processor portion of the processor/input plate assembly.

8. The urometer of claim 4, wherein said common receiver plate is positioned within said reservoir such that a lowermost edge portion thereof is disposed adjacent an interior surface of said bottom wall.

9. The urometer of claim 4, wherein said retaining shoulder members are secured to said side inner wall by an adhesive.

10. An apparatus for determining and monitoring the position of a fluid relative to a reference point comprising:
- a single piece hollow reservoir adapted to hold adapted to hold said fluid therein;
- said reservoir including:
  - an inner side wall;
  - an outer side wall;
  - a pair of end walls;
  - a bottom wall;
  - a first hollow reservoir column disposed within said reservoir;
- a second hollow reservoir column disposed within said reservoir generally parallel to said first hollow reservoir column;
- said first column and said second column spaced apart so that said fluid is able to flow easily therebetween;
- a plurality of independent input elements arranged generally parallel to one another and in spaced apart relation to one another;
- said independent input elements being disposed on a processor/input plate circuit board assembly comprising a processor portion;
- a common receiver plate spaced apart but adjacent said input element for receiving electrical output signals coupled thereonto such that said receiver plate in cooperation with said input elements forms a plurality of independent capacitors;
- said first hollow reservoir column receiving at least a major portion of said processor/input plate circuit board assembly;
- said second hollow reservoir column receiving at least a major portion of said common receiver plate;
- a controller for applying an electrical signal to each said input element to sequentially electrically excite each of said input elements;
- said controller including:
  - an amplifier for generating a voltage signal representative of each said electrical output signal;
  - a peak detector for detecting a peak magnitude of each said voltage signal coupled onto said receiver plate as each of said input elements is electrically excited;
  - a comparative for comparing said voltage signals against a reference value; and
- said controller determining from said voltage signals which ones of said capacitors have experienced a change in capacitance and the relative percentage of coverage of each said capacitor by said fluid to make a determination of the position of said fluid within a predetermined area.

11. The apparatus of claim 10, wherein said first column and said second column are spaced apart by a distance within the range of about 0.15 inch–0.30 inch.

12. The apparatus of claim 10, wherein said processor/input plate circuit board assembly is mounted to and spaced apart from said common receiver plate by a plurality of standoffs.

13. The apparatus of claim 12 wherein said standoffs are positioned so that said standoffs rest on an upper edge surface of both said first hollow reservoir column.

14. The apparatus of claim 10, wherein bottom portions of said processors/input plate circuit board assembly and said common receiver plate rest on bottom inner wall portions of said first and second hollow reservoir columns.

* * * * *